United States Patent [19]
Malczewski

[11] Patent Number: 5,586,395
[45] Date of Patent: Dec. 24, 1996

[54] LEVEL ANGLE GAUGE

[75] Inventor: Jerry P. Malczewski, Evergreen, Colo.

[73] Assignee: Malczewski Holdings, Inc., Evergreen, Colo.

[21] Appl. No.: 316,557

[22] Filed: Sep. 30, 1994

[51] Int. Cl.$^6$ .................................................. B43L 7/10
[52] U.S. Cl. ........................ 33/471; 33/451; 33/500
[58] Field of Search ............................ 33/471, 415, 416, 33/417, 451, 452, 455, 465, 495, 500, 497, 499

[56] References Cited

U.S. PATENT DOCUMENTS

| | | |
|---|---|---|
| 409,414 | 8/1889 | Meek . |
| 622,569 | 4/1899 | Van Namee ............................. 33/471 |
| 704,369 | 7/1902 | Pritt ....................................... 33/451 |
| 875,462 | 12/1907 | Rowan . |
| 939,405 | 11/1909 | Erikson et al. ........................ 33/455 |
| 1,014,402 | 1/1912 | Larsen .................................... 33/465 |
| 1,033,742 | 7/1912 | Skates .................................... 33/451 |
| 1,095,149 | 4/1914 | Hammer .................................. 33/465 |
| 1,145,719 | 7/1915 | Tucker .................................... 33/471 |
| 1,324,411 | 12/1919 | Rosenholm . |
| 1,380,243 | 5/1921 | Osborn . |
| 2,251,208 | 7/1941 | Sigmon . |
| 2,878,569 | 3/1959 | Metrulis . |
| 3,522,657 | 8/1970 | Metrulis . |
| 4,144,650 | 3/1979 | Rawlings . |
| 4,394,801 | 7/1983 | Thibodeaux ............................ 33/451 |
| 4,745,689 | 5/1988 | Hiltz ...................................... 33/471 |
| 4,922,621 | 5/1990 | Maier ..................................... 33/471 |
| 5,187,877 | 2/1993 | Jory et al. .............................. 33/471 |

Primary Examiner—Christopher W. Fulton
Attorney, Agent, or Firm—Timothy J. Martin; Michael R. Henson

[57] ABSTRACT

A level angle gauge is used to capture an angular measurement on a structure. The level angle gauge includes an elongated body structure, a leveling element connected to the body structure, an arm structure pivotally connected to the body and an arm lock mechanism that locks and unlocks to allow and inhibit pivotal movement of the arm structure. The body structure has opposite sides and a reference surface extending therebetween. The arm has an arm surface that is in a common plane with the reference surface in a first position. The arm lock mechanism being dimensioned to be less than the width of the reference surface. The body structure is formed as a web having opposite flange, one of which is foreshortened. The arm structure includes a pair of parallel arm members such that the web of the body structure interposed therebetween. A connector piece joins the arm members, and a notch is provided in the web to receive the connector piece when the arm structure is in the first position.

22 Claims, 6 Drawing Sheets

LEVEL ANGLE GAUGE

FIELD OF INVENTION

The present invention relates to a tool for capturing an angular measurement of a structural surface relative to an imaginary horizontal or vertical plane. More particularly, the present invention is directed to a level angle gauge which is used to capture an angular measurement of a structural surface relative to an imaginary plane so that the captured angular measurement can be transferred onto a workpiece when the level angle gauge is positioned thereon.

BACKGROUND OF THE INVENTION

A variety of building materials are used for the exterior of contemporary houses that not only provide structural integrity but also aesthetic appeal. Such building materials include brick, wood, stucco and siding panels. Siding panels are fabricated from a variety of materials such as aluminum, wood and vinyl. Although exterior siding panels are attractive as well as durable, often, the services of professional siding contractors are required due to the difficulty of installing the siding panels onto the house particularly where angled cuts are required. For example, to facilitate installation on an upper portion of a vertical wall proximate to the pitch of a roof the siding panel must be cut at an angle conforming to the pitch of the roof.

To capture angular measurements siding contractors typically use a pocket bevel gauge to determine the appropriate angle necessary for cutting the siding panel to conform to the pitch of the roof. The pocket bevel gauge includes a handle having a slot formed therethrough. A slotted blade is disposed within the slot of the handle and a screw and butterfly nut set enables the siding contractor to lock the blade at any angular position relative to the handle thereby releasably retaining the blade at an angular position on and relative the handle. After guessing at an imaginary horizontal plane, the siding contractor positions the handle parallel thereto and positions the blade at an angle with respect to the pitch of the roof. The bolt and butterfly nut set is tightened to retain the blade in a position relative to the handle so as to capture the angular measurement which can then be transferred onto the siding panel for an appropriate cut.

Another tool used for capturing angular measurement is shown in U.S. Pat. No. 1,324,411 to Rosenholm which discloses a combination tool. This combination tool includes an oblong body having two spirit level tubes so that the oblong body can be disposed in an imaginary horizontal plane without guessing. The oblong body also includes a rule which is pivoted at one end of the oblong body. The oblong body has a longitudinal slot formed into one side edge so that the rule can be folded thereinto. The tool also includes a first locking mechanism for locking the rule in a closed position, a second locking mechanism for locking the rule in its extended position and a third locking mechanism, which is a threaded bolt and nut set, for locking the rule anywhere between its closed position and its extended position. A particular disadvantage in using this combination tool is when a siding contractor must work in muddy conditions when installing the siding panels onto the house. Under such conditions, if this combination tool falls into mud, it could be rendered useless until it is meticulously cleaned because mud could infiltrate the slot and prevent movement of the rule.

U.S. Pat. No. 875,462 to Rowan reveals a combined spirit level and gauge which includes a pair of staffs. Each staff includes a pair of blades with one carrying a horizontally-disposed spirit level tube and the other carrying a vertically-disposed spirit level tube. Each blade is pivotally connected at an end of respective staffs. A threaded bolt and nut set which projects outwardly relative to common sides of the staffs is used to lock the two staffs together at a desired angular position with respect to each other.

Also, two other devices described in U.S. Pat. No. 2,878,569 and U.S. Pat. No. 3,522,657, both to Metrulis can be used to capture angular measurements of structural surfaces relative to an imaginary horizontal plane. Both devices are a combination level, rule and protractor device. The combination level, rule and protractor device includes a pair of arms pivotally connected together by a hinge and a plurality of spaced spirit level tubes. The combination device also includes a protractor mounted on one of the arms and a front cover plate mounted on the other arm. With a locking screw engaged with a locking screw opening, the arms can be locked in any angular position between 0° and 180° with respect to the arms.

The prior art described hereinabove provides a flat side so that the tool can rest flushly against a flat support wall when capturing the angular measurement. Unfortunately, the prior art has only one side which can rest flushly against a wall when capturing the angular measurement. The reverse side has an arm lock mechanism which projects therefrom. Thus, when reversed, i.e., flip-flopping the tool after capturing a right-handed angle so as to capture a left-handed angle, the arm lock mechanism causes the tool to wobble when placed against the wall. Also, all of the prior art tools show a bolt and wing nut set for use as an arm lock mechanism. Typically, a wing nut requires the use of a forefinger and thumb of the siding contractor in order to tighten or loosen the arm lock mechanism.

There is a need in the industry to provide a level angle gauge which can rest flush against a flat support wall without wobbling when capturing a right-handed or a left-handed angular measurement of a structural surface relative to an imaginary horizontal or vertical plane. There is also a need in the industry to provide an arm lock mechanism which is easier to operate. It would be advantageous if the level angle gauge could be easily cleaned if accidentally dropped in mud or dirt. The present invention satisfies these needs and provides this advantage.

SUMMARY OF INVENTION

It is an object of the present invention to provide a new and useful level angle gauge which can rest flushly against a flat support wall when capturing either a right-handed or left-handed angular measurement of a structural surface relative to an imaginary horizontal or vertical plane.

It is another object of the present invention to provide a level angle gauge that is easy to clean when infiltrated with undesirable material such as dirt or mud.

It is yet another object of the present invention to provide a level angle gauge having an arm lock mechanism which can be easily locked or unlocked by using a finger or a thumb.

A still further object of the present invention is to provide a level angle gauge which can also be used as a level, an extended level or a square.

Yet another object of the present invention is to provide a level angle gauge that includes indicia for a user to quantatively determine the degree of the angle or the pitch of the structural surface relative to the imaginary horizontal plane.

Accordingly, a level angle gauge of the present invention is adapted for use to capture an angular measurement of a structural surface relative to an imaginary horizontal or vertical plane so that the captured angular measurement can be transferred onto a workpiece when the level angle gauge is positioned thereon. In its broadest form, the level angle gauge includes an elongated body structure, a leveling element, an arm structure and an arm lock mechanism. The elongated body structure has a pair of oppositely disposed sides and a reference surface which extends therebetween and has a surface width. The leveling element is connected to the body structure and is operative to indicate that the reference surface of the body structure is oriented parallel to the imaginary plane when the angular measurement is being made.

The arm structure has an arm surface and is pivotally connected to the body structure. The arm structure is movable between a first position and a second position. In the first position, the arm structure is oriented in a common plane with the reference surface of the body structure. In the second position, the arm surface is oriented at an angle relative to the reference surface. The arm surface has an arm surface width that is substantially equal to and less than the reference surface width. The arm lock mechanism is operative in an unlocked state to permit the arm structure to pivot between the first position and the second position and in a locked state to releasably retain the arm structure in either the first position or the second position. In the second position when the reference surface is oriented parallel to the imaginary plane (horizontal or vertical) and the arm surface is disposed in registration with the structural surface, the arm structure and the body structure can be locked together to capture the angular measurement so that the captured angular measurement can be transferred on the workpiece when the level angle gauge is positioned thereon.

The arm lock mechanism includes a threaded bolt and a threaded nut which is matably engaged with the bolt. The bolt extends axially through aligned holes formed in the arm structure and the body structure so that in the locked state, the bolt and nut compress the arm structure and the body structure together to inhibit angular movement therebetween. The bolt has a bolt length, and the reference surface width is greater than the bolt length. The bolt is disposed between and within the sides of the body structure. The nut has a cross-sectional shape of a teardrop. One of the holes formed through the arm structure and the body structure is square shaped. A part of the bolt has a square cross-sectional configuration which is sized and adapted to be received by the square hole in a closely-fitted relationship.

The level angle gauge also includes a spacer and a bias element. The spacer has a centrally-located spacer hole sized and adapted to rotatably receive the bolt and is disposed between the arm structure and the body structure. The bias element has a centrally-located biased element hole sized and adapted to rotatably receive the bolt and is disposed between the arm structure and the spacer.

An alternative embodiment of the level angle gauge also includes an elongated body structure, an arm structure, a leveling element and an arm lock mechanism. The body structure includes a web, a first flange and a second flange. The web has a first lateral edge and an opposite second lateral edge. The first flange is connected to and extends along the first lateral edge of the web and the second flange is connected to and extends along the second lateral edge of the web. The second flange is foreshortened with respect to the web so as to leave an exposed edge portion of the second lateral edge of the web. The first and second flanges form respective parallel spaced-apart first and second flat surfaces with the web extending therebetween. The first flat surface has a first flat surface width and the second flat surface has a second flat surface width.

The arm structure is disposed along the elongated body structure and includes a pair of parallel spaced-apart arm members with the lateral arm edge of each arm member disposed on a common side of the arm structure. The lateral arm edges together define an arm reference plane. The arm structure is pivotally mounted with respect to the elongated body structure such that the arm structure pivots between a first position and a second position. In the first position, a portion of the web adjacent the exposed edge portion of the web is interposed between the first and second arm members with the second flange surface being in a common plane with the arm reference surface. In the second position, the arm reference plane is positioned with respect to the second flange surface. In the second position, when the second flange surface is oriented parallel to the imaginary plane and the arm reference plane is disposed in registration with the structural surface, the arm structure and the body structure can be locked to each other by the arm lock mechanism to capture the angular measurement. A connector piece is rigidly connected to and between the pair of arm members at a distal arm end portion thereof so that the arm members can angularly move simultaneously between the first position and the second position. The exposed edge portion of the web includes a notch formed therein. The notch is sized and adapted to receive the connector piece when the arm structure is disposed in the first position. The bolt of the arm lock mechanism extends through axially-aligned holes formed in each arm member of the arm structure and the web of the body structure so that in the locked state the matable bolt and nut compress the pair of arm members and the web together to obtain the arm structure and the body structure in either the first position or the second position.

This alternative embodiment of the level angle gauge includes a pair of spacers and a pair of bias elements. Each spacer is disposed between a respective one of the arm members and the web. Each bias element is disposed between respective ones of the arm members and the spacers. At least one of the arm members has a square-shaped hole formed therethrough. Correspondingly, a portion of the bolt has a square cross-sectional shape which is sized and adapted to be received by the square-hole in a closely fitted relationship to prevent the bolt from rotating relative to the arm members.

The arm reference surface has an arm surface width. The arm surface width is less than the second flat surface width. The arm structure is centrally disposed between opposite second surface edges of the second flange surface. The arm locking mechanism has a length that is less than the second flat surface width and is centrally disposed between the opposite second surface edges of the second flange surface. The body structure has a body length and the arm structure has an arm length. The body length is at least twice as great as the arm length. It is preferred that the first flat surface width and the second flat surface width are equal and that the first flange and the second flange are centrally disposed along the web between respective ones of opposite first flange edges and opposite second flange edges.

The arm structure is operative to pivot from the first position 180° to the second position to form an extended level. The first flange can also be foreshortened and the end portion of the web so that the arm structure is enabled to pivot 270° between the first position and the second position to form a square. It is preferred that the arm structure includes indicia so that when the arm structure is moved to the second position to capture the angular measurement of the structural surface relative to the imaginary plane, a user can determine the quantitative angular measurement thereof by reading a select one of the indicia aligned with the exposed edge portion of the second lateral edge of the web.

These and other objects of the present invention will become more readily appreciated and understood from a consideration of the following detailed description of the exemplary embodiment of the present invention when taken together with the accompanying drawings, in which:

DETAILED DESCRIPTION OF THE EXEMPLARY EMBODIMENTS

A level angle gauge is adapted for use to capture an angular measurement of a structural surface relative to an imaginary horizontal or vertical plane so that the captured angular measurement can be transferred onto a workpiece when the level angle gauge is positioned thereon. The level angle gauge of the present invention is particularly useful to capture the angular measurement of the structural surface conforming to the pitch of a roof of a house relative to an imaginary horizontal or vertical plane. However, one of ordinary skill in the art would appreciate that the level angle gauge of the present invention can be useful to capture angular measurements of any structural surface relative to the imaginary horizontal plane. For example, the inclination of a stairs structure can be captured by the level angle gauge of the present invention. Furthermore, as the description proceeds, the skilled artisan would also appreciate that the level angle gage of the present invention can also be used as a level, a extended level and a square.

Figure 1:
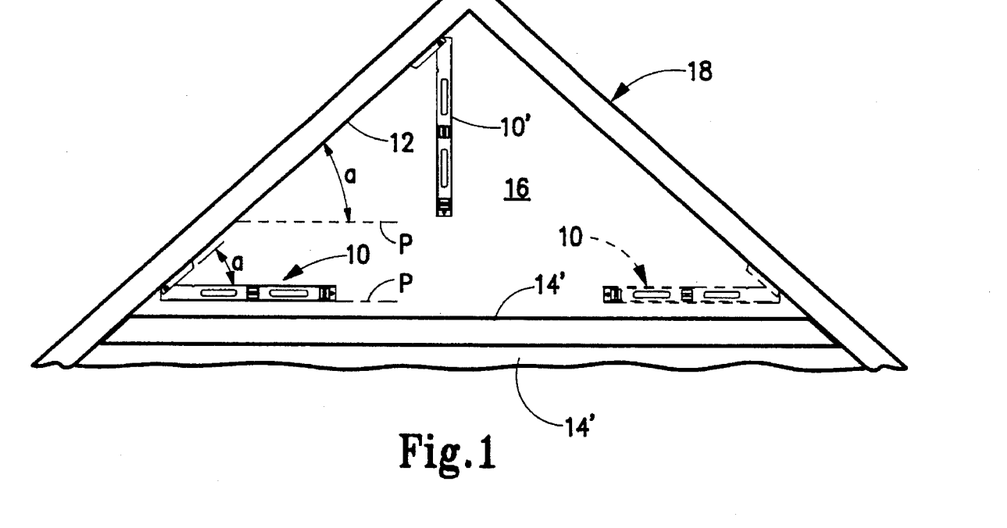
FIG. 1 is a side view in elevation of a level angle gauge of the present invention shown positioned flushly against a vertical wall proximate to a pitched roof of a conventional house for capturing an angular measurement of a support structure of the pitched roof relative to either an imaginary horizontal plane or an imaginary vertical plane.
Figure 2:
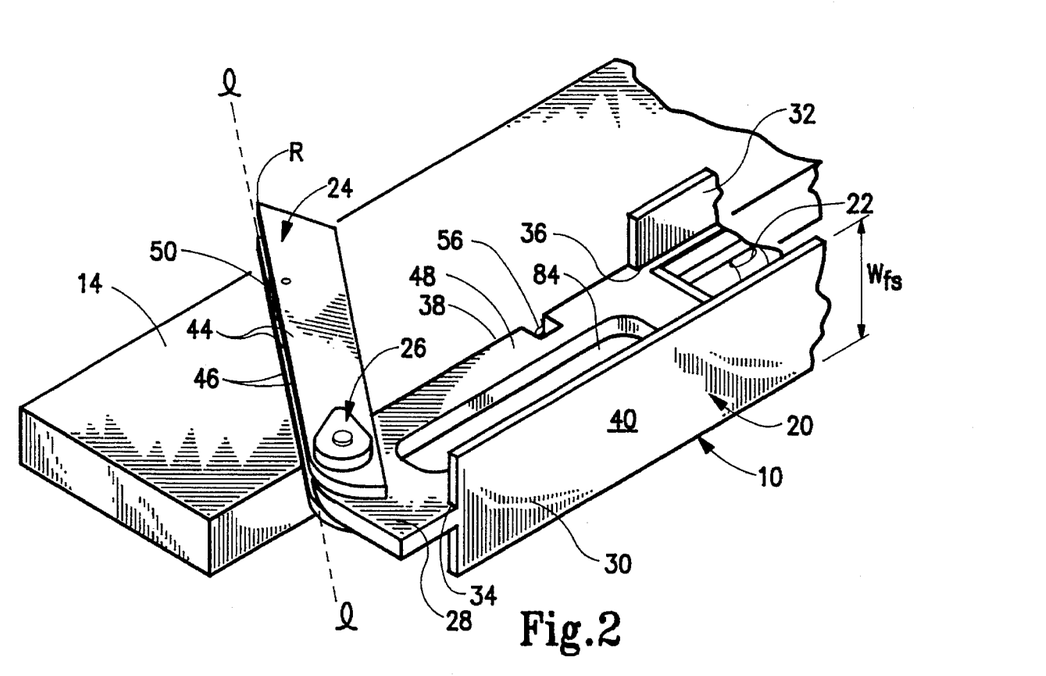
FIG. 2 is a partial perspective view of the level angle gauge of the present invention showing the captured angular measurement being transferred onto a workpiece.

A level angle gauge 10 of the present invention is generally introduced in FIGS. 1–11. With reference to FIGS. 1 and 2, level angle 10 is adapted for use to capture an angular measurement "a" of a structural surface 12 relative to an imaginary horizontal plane "p" so that the captured angular measurement "a" can be transferred onto a workpiece 14 when level angle gauge 10 is positioned thereon. Level angle gauge 10' is shown capturing an angle relative to an imaginary vertical plane, and it should be understood that level angle gauges 10 and 10' are the same tool as described herein. Thus, this description will hereinafter refer to this tool as "level angle gauge 10". Also, by way of example only, workpiece 14 can be a conventional siding panel fabricated from either aluminum, wood or vinyl. After line "1" is scribed onto workpiece 14, a siding contractor cuts the workpiece therealong to form a finished workpiece 14' so that it can be installed onto a vertical wall 16 of a house 18.

Figure 3:
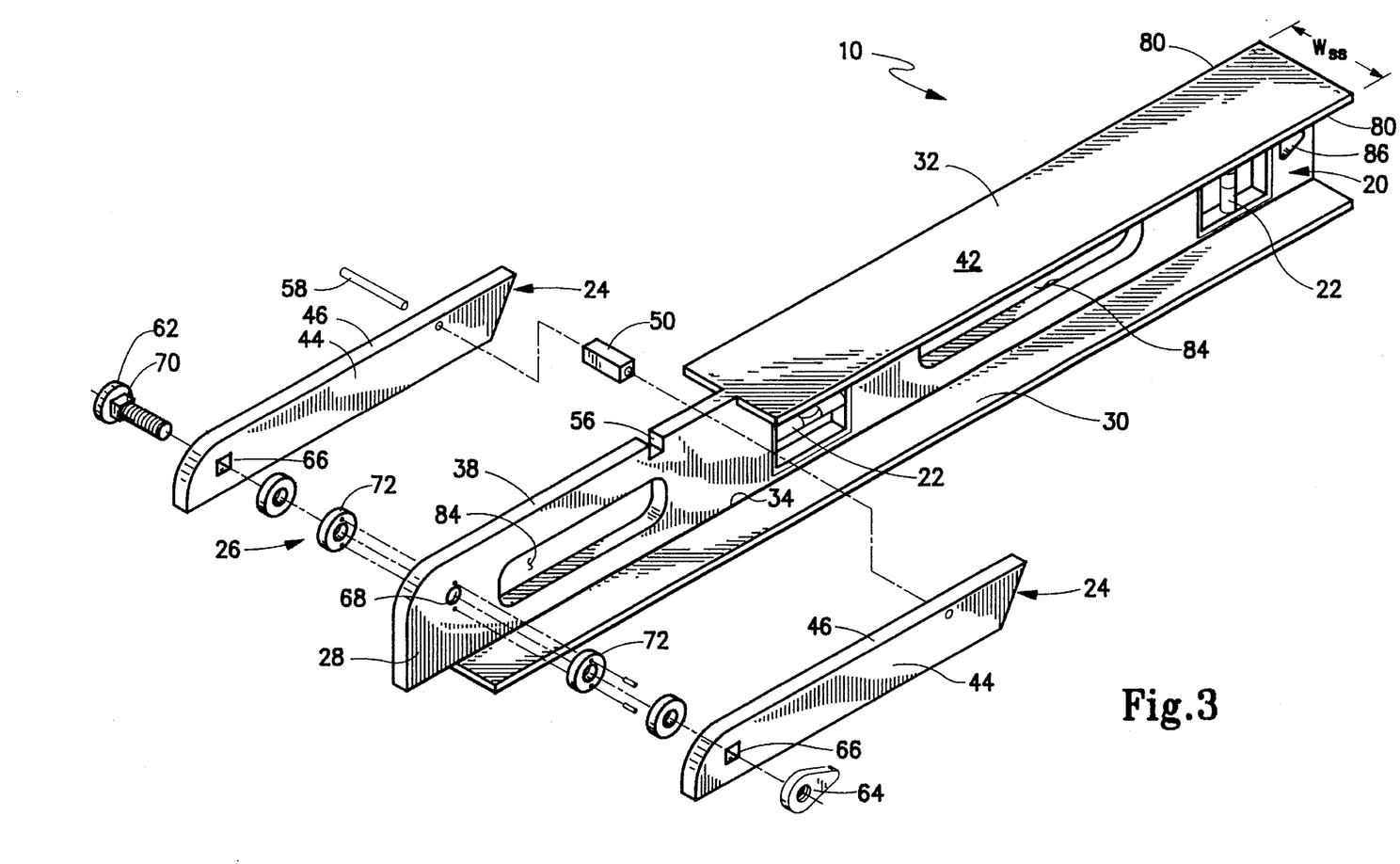
FIG. 3 is an exploded perspective view of the level angle gauge of the present invention shown in FIGS. 1 and 2.

Level angle gauge 10 includes an elongated body structure 20, a leveling element 22, an arm structure 24 and an arm lock mechanism 26. Body structure 20 includes a web 28, a first flange 30 and a second flange 32. Web 28 has a first lateral edge 34 and an opposite second lateral edge 36. First flange 30 is connected to and extends along first lateral edge 34 of web 28. Second flange 32 is connected to and extends along second lateral edge 36 of web 28 and is foreshortened with respect thereto so as it leave an exposed edge portion 38 of second lateral edge 36 of web 28. First and second flanges 30 and 32 form respective parallel spaced-apart first and second flat flange surfaces 40 and 42 with web 28 extending therebetween. As best shown in FIGS. 2 and 3, first flat flange surface 40 has a first surface width "$w_{fs}$" and second flat flange surface 42 has a second surface width "$w_{ss}$".

Figures 4, 5:
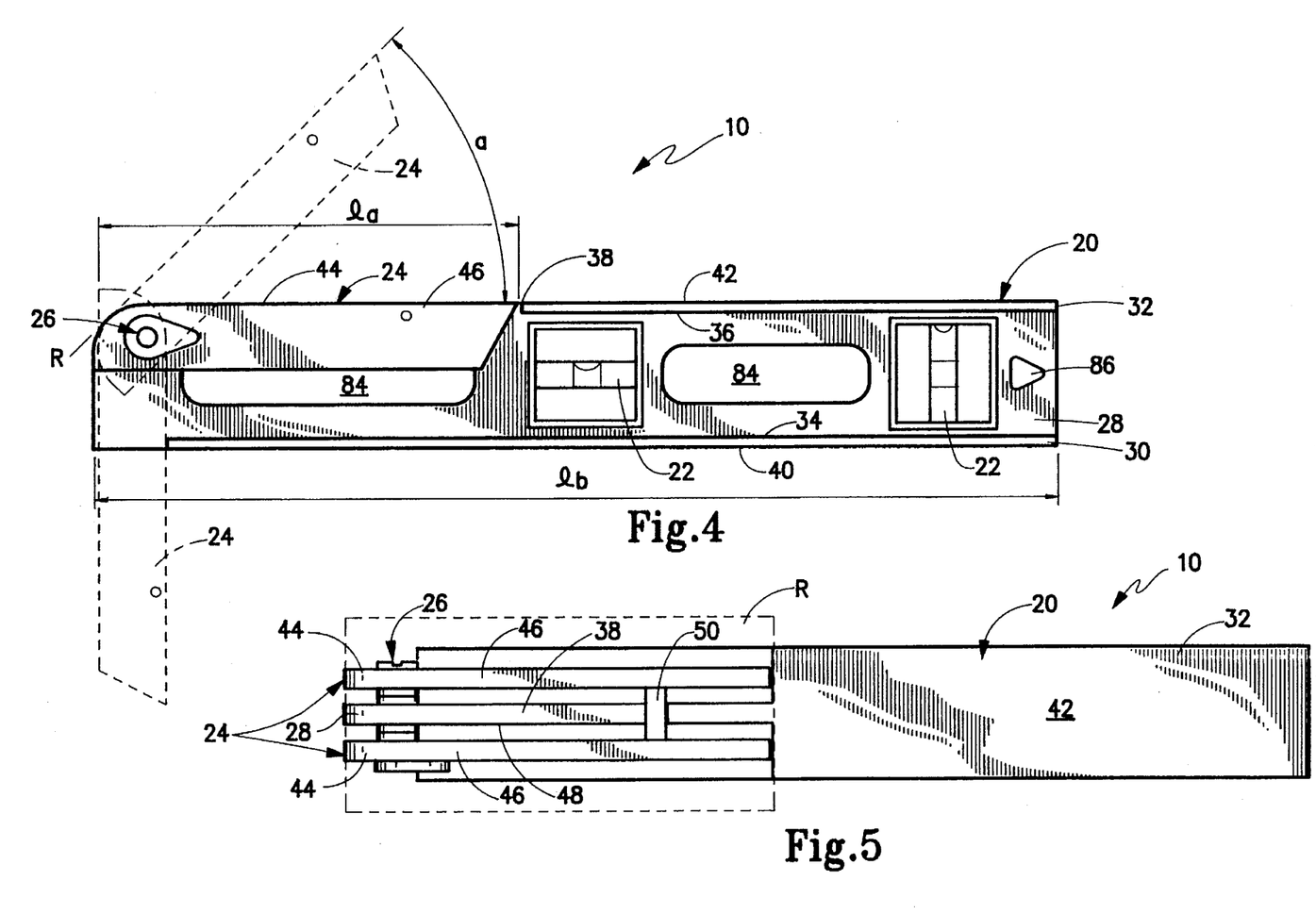
FIG. 4 is a side view in elevation of the level angle gauge showing an arm structure disposed in a first position and two views of a phantomly drawn arm structure in second positions.
FIG. 5 is a top plan view of the level angle gauge shown in FIG. 4 with the arm structure in the first position.

Arm structure 24 is disposed on elongated body structure 20 and includes a pair of parallel spaced-apart arm members 44 with a lateral arm edge 46 of each arm member 44 disposed on a common side of arm structure 24. Together, lateral arm edges 46 define an arm reference plane "r" as best shown in FIGS. 2 and 4. Arm structure 24 is pivotally mounted with respect to elongated body structure 20 such that arm structure 24 pivots between a first position as best shown in FIG. 4 and a second position as best shown in FIG. 2. A web portion 48 of web 28 (as best shown in FIG. 2) adjacent to exposed edge portion 38 is interposed between pair of arm members 44 (as best shown in FIG. 5) with second flange surface 42 being in a common plane with arm reference plane "r". In the second position, arm reference plane "r" is positioned at an angle "a" with respect to second flange surface 42 as shown in FIG. 4. Leveling element 22 is connected to web 28 of body structure 20 and is operative to indicate that second flange surface 42 is oriented parallel relative to the imaginary horizontal plane "p" when making the angular measurement. Level element 22' is also connected to web 28 for orienting second flange surface 42 parallel to an imaginary plane that is vertical to plane "p". Although not by way of limitation, leveling elements 22 are conventional spirit level tubes oriented perpendicularly to each other. A skilled artisan would appreciate one spirit level tube is connected to body structure 20 to assure level angle gauge 10 is oriented in the imaginary horizontal plane while the remaining spirit level tube is connected to body structure 20 to assure level angle 10 is oriented perpendicularly to the imaginary horizontal plane.

Arm lock mechanism 26 is operative in an unlocked state and in a locked state. In the unlocked state, arm lock mechanism 26 permits arm structure 24 to pivot between the first position and the second position. In the locked state, arm lock mechanism 26 releasably retains arm structure 24 in one of the first position and the second position. In the second position, when second flange surface 42 is oriented parallel to the imaginary horizontal (or vertical) plane and when arm reference plane "r" is disposed in registration with structural surface 12, arm structure 24 and body structure 20 can be locked to each other to capture angular measurement "a" so that the captured angular measurement "a" can be transferred onto workpiece 14 when level angle gauge 10 is positioned thereon.

Figures 6, 7, 8:
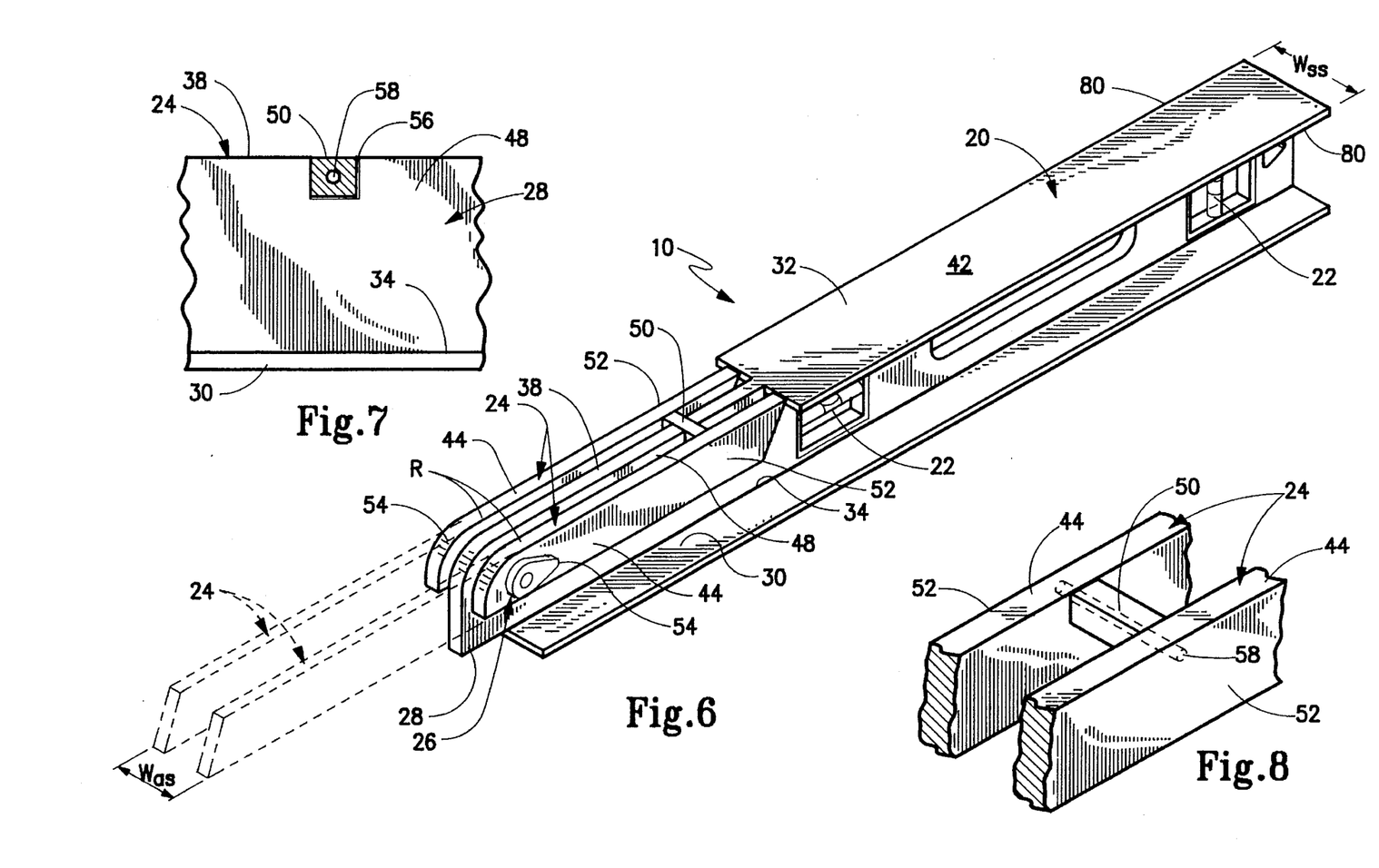
FIG. 6 is a perspective view of the level angle gauge of the present invention with the arm structure in the first position and a phantomly-drawn arm structure disposed 180° therefrom in a second position to form an extended level.
FIG. 7 is an enlarged partial side view in elevation of a web with a notch that receives a connector piece shown in cross-section.
FIG. 8 is an enlarged partial perspective view of a pair of arm members of the arm structure rigidly connected together by the connector piece shown in FIG. 7.
Figures 9, 10:
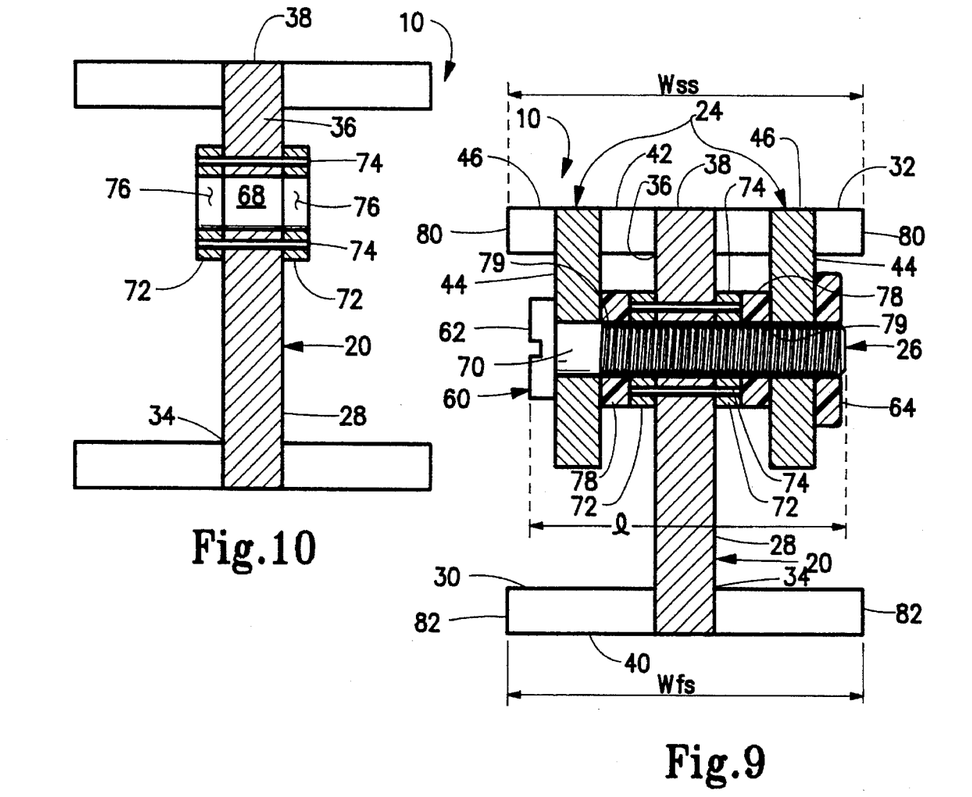
FIG. 9 is a front elevational view partial in cross-section of an arm lock mechanism connected to the pair of arm members and the body structure with the pair of arm members in the first position.
FIG. 10 is a front elevational view partial in cross-section of a body structure with a pair of spacers riveted thereto showing axially-aligned holes formed therethrough.

With reference to FIGS. 8 and 9, a connector piece 50 is rigidly connected to and between the pair of arm members 44 so that arm members 44 can angularly move simultaneously between the first position and the second position. Specifically, connector piece 50 is rigidly connected to and between the pair of arm members 44 at respective distal arm end portions 52 of each of arm member 44 as best shown in FIG. 6. Distal arm end portions 52 are disposed opposite respective pivotal arm end portions 54 of the pair of arm members 44. In FIG. 7, exposed edge portion 38 of web 28 includes a notch 56 formed therein. Notch 56 is sized and adapted to receive connector piece 50 when arm structure 24 is disposed in the first position. A rivet 58 extends through connector piece and through and between arm members 44 to rigidly connect connector piece 50 to arm structure 24. It is preferred that the opposite ends of rivet 58 are flush mounted to arm members 44.

FIGS. 9 and 10 illustrate the operative relationship among body structure 20, arm structure 24 and arm lock mechanism 26. In FIG. 9, arm lock mechanism includes a matable bolt and nut set 60 which has a threaded bolt 62 and a threaded nut 64. Each arm member 44 includes an arm hole 66 and web 28 includes a web hole 68 as best shown in FIG. 3. Bolt 62 extends through axially-aligned arm holes 66 formed in each arm member 44 of arm structure 24 and web hole 68 formed in web 28 of body structure 20. Now, in the locked state, matable bolt and nut set 60 compresses the pair of arm members 44 and web 28 together thereby resiliently retaining arm structure 24 in one of the first position and the second position. At least one of arm holes 66 of arm members 44 has a square-hole formed therethrough. Further, a bolt portion 70 of bolt 62 has a square cross-sectional shape which is sized and adapted to be received by the square-shaped hole of arm member 44 in a closely-fitted relationship to prevent bolt 62 from rotating relative to arm members 44.

For the first exemplary embodiment of level angle gage 10 of the present invention, nut 64 has a cross-sectional shape of a teardrop. This teardrop shape is particularly useful for tightening or loosening arm lock mechanism 26 with either one finger or a thumb of the user. The teardrop-shaped nut 64 enables the user to more easily tighten and loosen arm lock mechanism 26.

As best shown in FIG. 10, level angle gauge 10 includes a pair of spacers 72 which are fabricated from a rigid material such as metal. Spacers 72 are rigidly connected on opposite sides of web 28 by a pair of pins 74. Each spacer 72 has a centrally-located hole 76 which axially aligns with web hole 68. Each spacer hole 76 is sized and adapted to rotatably receive bolt 62. With reference to FIG. 9, each spacer 72 is disposed between a respective one of arm members 44 and web 28.

In FIG. 9, level angle gauge 10 includes a pair of bias elements 78 which are fabricated from a stiff yet resilient material such as rubber. Each bias element has a centrally-located bias element hole 79 which axially aligns with spacer holes 76 and web hole 68. Each bias element hole 79 is sized and adapted to rotatably receive bolt 62 and is disposed between respective ones of arm members 44 and spacers 72.

As best shown in FIGS. 3 and 4, web 28 includes a plurality of primary apertures 84 and a secondary aperture 86 formed therethrough. Primary apertures 84 are useful for the user to securely grip level angle gauge 10. Secondary aperture 86 is useful for the user to hang level angle gauge 10 for storage purposes. Also, wall 16 might have items such as nails projecting therefrom. Primary apertures 84 and secondary aperture 86 can receive such items so that level angle gauge 10 can rest flush against wall 16 when capturing an angular measurement.

Arm structure 24 is operative to pivot 270° from the first position to the second position. As a result, arm structure 24 is operative to pivot 180° from the first position to the second position to form an extended level as best shown in FIG. 6. Also, first flange 30 is foreshortened at an end portion of web 28 so that arm structure 24 is enabled to pivot 270° between the first position and the second position to form a square as best shown in FIG. 4.

One of ordinary skill in the art would appreciate the ease at which the first exemplary embodiment could be easily cleaned if infiltrated with mud or dirt. Since arm structure 24 is operative so that arm member 44 straddles exposed edge portion 38, simply moving arm structure 24 would remove any mud found between arm members 44. A user's fingernail or some other small rigid instrument could remove mud from notch 56 if it is required that arm members 44 be moved to the first position.

Figure 11:
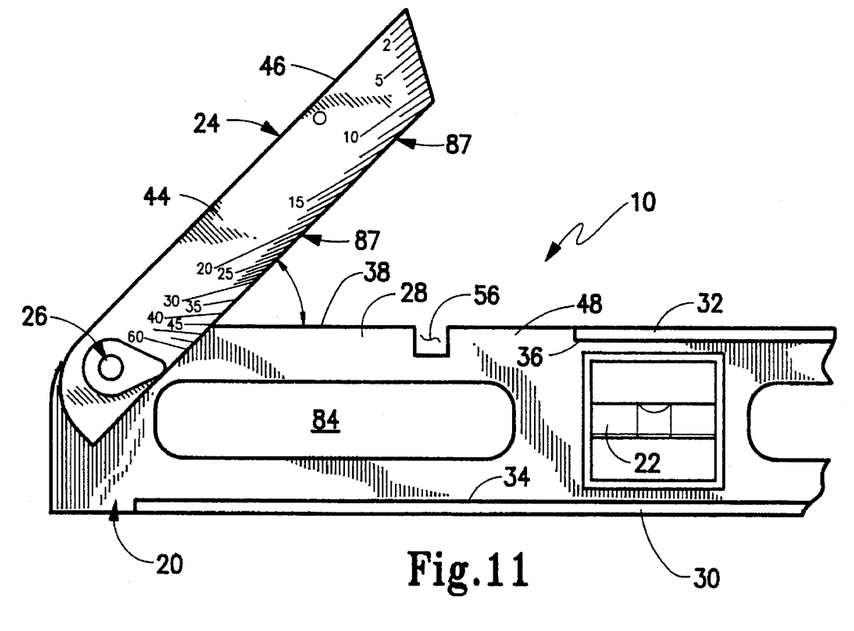
FIG. 11 is an enlarged side view in elevation showing the arm structure with indicia so that a user can determine the quantitative angular measurement by reading a select one of the indicia aligned with an exposed edge portion of the web.

With reference to FIG. 11, arm structure 24 includes indicia such as a plurality of indicator lines 87, some of which are associated with numbers. The numbers correspond to angular degrees, and degrees ranging from 2° to 60° are indicated on arm structure 24. Now, when arm structure 24 is moved to the second position to capture the angular measurement "a" of structural surface 12 relative to the imaginary horizontal plane "p", a user can determine the quantitative angular measurement thereof by reading a select one of the indicia aligned with exposed edge portion 38 of web 28. By way of example only in FIG. 11, the user would read that captured angular measurement "a" is 45°. Note that a distal end of indicator line associated with 45° aligns with exposed edge portion 38 of web 28.

For the first exemplary embodiment of level angle gauge 10 of the present invention, a variety of dimensional relationships are considered. Arm reference surface "r" has an arm surface width "$w_{as}$" which is less than second flat surface width "$w_{ss}$" as shown in FIG. 6. As a result, it is preferred that arm structure 24 is centrally disposed between opposite second surface edges 80 of second flange 32. As illustrated in FIG. 9, arm lock mechanism has a length "l" that is less than second flat surface width "$w_{ss}$". It is preferred that arm lock mechanism 26 is centrally disposed between opposite second surface edges 80 of second flange 32. Now, level angle gauge 10 can be flushly against the wall when capturing either a right-handed angular measurement or a left-handed angular measurement as shown in FIG. 1. In FIG. 4, body structure 20 has a body length "$l_b$" and arm structure 24 has an arm length "$l_a$". Body length "$l_b$" is at least twice as great as arm length "$l_a$". Again, with reference to FIG. 9, first flat surface width "$w_{fs}$" and second flat surface width "$w_{ss}$" are equal. As a result thereof, first flange 30 and second flange 32 are centrally disposed along web 28 between respective ones of opposite first flange edges 82 and opposite second flange edges 80.

Figure 12:
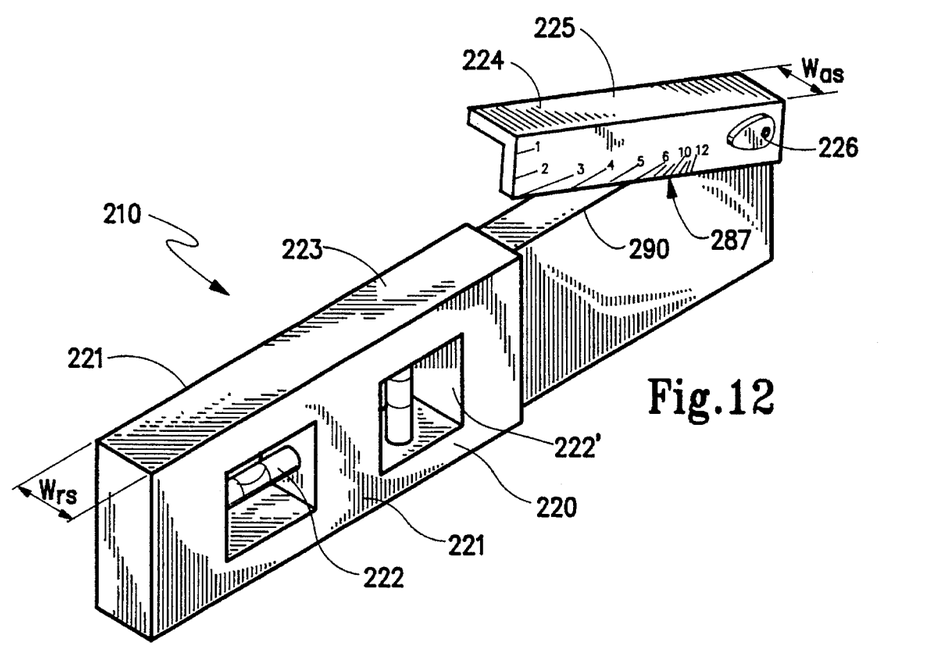
FIG. 12 is a perspective view of a second exemplary embodiment of the level angle gauge of the present invention.
Figure 13:
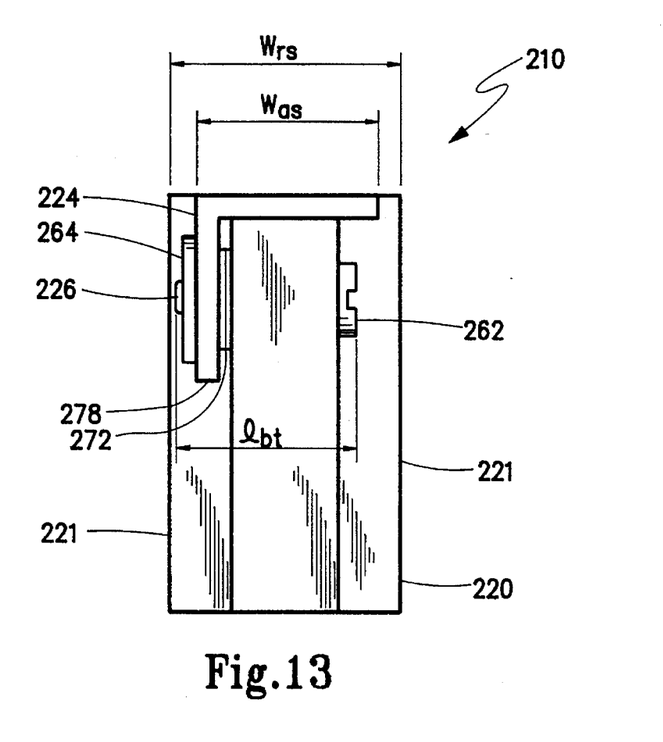
FIG. 13 is a front view in elevation of a body structure, an arm structure and an arm lock mechanism of the level angle gauge shown in FIG. 12.

A second exemplary embodiment of a level angle gauge 210 of the present invention is generally illustrated in FIGS. 12 and 13. Level angle gauge 210 includes an elongated body structure 220, a horizontal leveling element 222, a vertical leveling element 222', an arm structure 224 and an arm lock mechanism 226. Elongated body structure 220 has a pair of oppositely disposed sides 221 and a reference surface 223 extending therebetween. Reference surface 223 having a reference surface width "$w_{rs}$".

Leveling elements 222 (or 222') which is connected to body structure 220 is operative to indicate that reference surface 223 of body structure 220 is oriented parallel to the imaginary horizontal (or vertical) plane when the angular measurement "a" is being made. Arm structure 224 has an arm surface 225. In the first position, arm surface 225 is oriented in a common plane with reference surface 223 of body structure 220. In the second position, arm surface 225 is oriented at an angle "a" relative to reference surface 223. Arm surface 225 has an arm surface width "$w_{as}$" that is substantially equal to and less then reference surface width "$w_{rs}$". In the second position, when reference surface 223 is oriented parallel to the imaginary horizontal plane and when arm surface 225 is disposed in registration with structural surface 12, arm structure 224 and body structure 220 can be locked together to capture angular measurement "a" so that captured angular measurement "a" can be transferred onto workpiece 14 when level angle gauge 210 is positioned thereon. Here, again indicia 287 are provided to register the angular measurement. While indicia could be provided to measure degrees, as shown in FIG. 11, it is also possible to calibrate the angle as a "pitch" as is shown by indicia 287 in FIG. 12. here, angle "a" is at the pitch "6" shown by the registration of the associated pitch line with edge 290.

In FIG. 13, arm lock mechanism 226 includes a threaded bolt 262 and a threaded nut 264 which is matably engaged with bolt 262. Bolt 262 extends through axially-aligned holes formed in arm structure 224 and body structure 220 so that in the locked state bolt 262 and nut 264 compress arm structure 224 and body structure 220 together thereby resiliently retaining arm structure 224 in one of the first position and the second position. Bolt 262 has a bolt length "$l_{bt}$". Reference surface "$w_{rs}$" is greater than bolt length "$l_{bt}$". Bolt 262 is disposed between and within sides 221 of body structure 220.

Level angle gauge 210 also includes a spacer 272 and a bias element 278. Spacer 272 is disposed between arm structure 224 and body structure 220. Bias element 278 is disposed between arm structure 224 and spacer 272.

The level angle gauge of the present invention is reversible so that it can rest flushly against the wall when capturing a right-handed angular measurement or a left-handed angular measurement. The level angle gauge of the present invention is easy to clean when infiltrated with dirt or mud. The arm lock mechanism of the level angle gauge of the present invention can be easily locked or unlocked by a finger or, if preferred, a thumb. The arm structure of the level angle gauge of the present invention includes indicia so that the user can determine quantitatively either the pitch or degrees of inclination of the support surface relative to the imaginary horizontal reference plane. Additionally, the level angle gauge of the present invention can also be used as a level, an extended level or a square.

Accordingly, the present invention has been described with some degree of particularity directed to the preferred embodiment of the present invention. It should be appreciated, though, that the present invention is defined by the following claims construed in light of the prior art so that modifications or changes may be made to the preferred embodiment of the present invention without departing from the inventive concepts contained herein.

I claim:

1. A level angle gauge adapted for use to capture an angular measurement of a structural surface relative to an imaginary plane so that the captured angular measurement can be transferred onto a workpiece when said level angle gauge is positioned thereon, said level angle gauge comprising:

(a) an elongated body structure having a pair of oppositely disposed sides extending in a longitudinal direction and a reference surface extending therebetween, said reference surface having a reference surface width that is oriented transversely to said longitudinal direction;

(b) a leveling element connected to said body structure and operative to indicate that said reference surface of said body structure is oriented parallel to the imaginary plane when the angular measurement is being made;

(c) an arm structure having an arm surface and being pivotally connected to said body structure, said arm structure movable between a first position wherein said arm surface is oriented in a common plane with said reference surface of said body structure and a second position wherein said arm surface is oriented at an angle relative to said reference surface, said arm surface having an arm surface width that is less than said reference surface width; and (d) an arm lock mechanism operative in an unlocked state to permit said arm structure to pivot between the first position and the second position and in a locked state to releasably retain said arm structure in one of the first position and the second position whereby when in the second position with said reference surface being oriented parallel to the imaginary plane and with said arm surface being disposed in registration with the structural surface, said arm structure and said body structure can be locked together to capture the angular measurement so that the captured angular measurement can be transferred onto the workpiece when said level angle gauge is positioned thereon, said arm lock mechanism being dimensioned to have a length in a direction transverse to said body structure which length is less than the reference surface width.

2. A level angle gauge according to claim 1 wherein said arm lock mechanism includes a threaded bolt and a threaded nut matably engaged with said bolt whereby said bolt extends through axially aligned holes formed in said arm structure and said body structure so that in the locked state said bolt and nut compress said arm structure and said body structure together thereby resiliently retaining said arm structure in one of the first position and the second position.

3. A level angle gauge according to claim 2 wherein said nut is has a cross-sectional shape of a teardrop.

4. A level angle gauge according to claim 2 wherein one of the holes formed in said arm structure and said body structure is square shaped and wherein a part of said bolt has a square cross-sectional configuration sized and adapted to be received by said square hole in a closely-fitted relationship.

5. A level angle gauge according to claim 2 including a spacer having a centrally-located spacer hole sized and adapted to rotatably receive said bolt and disposed between said arm structure and said body structure.

6. A level angle gauge according to claim 5 including a bias element having a centrally-located bias element hole sized and adapted to rotatably receive said bolt and disposed between said arm structure and said spacer.

7. A level angle gauge adapted for use to capture an angular measurement of a structural surface relative to an imaginary plane so that the captured angular measurement can be transferred onto a workpiece when said level angle gauge is positioned thereon, said level angle gauge comprising:

(a) an elongated body structure including a web having a first lateral edge and an opposite second lateral edge, a first flange connected to and extending along said first lateral edge of said web and a second flange connected to and extending along said second lateral edge of said web and foreshortened with respect thereto so as to leave an exposed edge portion of said second lateral edge of said web, said first and second flanges forming respective parallel spaced-apart first and second flat flange surfaces with said web extending therebetween, said first flat flange surface having a first surface width and said second flat surface having a second flat flange surface width;

(b) an arm structure disposed on said elongated body structure, said arm structure including a pair of parallel spaced-apart arm members with a lateral arm edge of each arm member disposed on a common side of said arm structure, said lateral arm edges together defining an arm reference plane, said arm structure pivotally mounted with respect to said elongated body structure such that said arm structure pivots between a first position wherein a portion of said web adjacent said exposed edge portion is interposed between said pair of arm members with said second flange surface being in a common plane with said arm reference surface and a second position wherein said arm reference plane is positioned at an angle with respect to said second flange surface;

(c) a leveling element connected to said web of said body structure and operative to indicate that said second flange surface is oriented parallel relative to the imaginary plane when making the angular measurement; and (d) an arm lock mechanism operative in an unlocked state to permit said arm structure to pivot between the first position and the second position and in a locked state to releasably retain said arm structure in one of the first position and the second position whereby when in the second position with said second flange surface being oriented parallel to the imaginary plane and with said arm reference plane being disposed in registration with the structural surface, said arm structure and said body structure can be locked to each other to capture the angular measurement so that the captured angular measurement can be transferred onto the workpiece when said level angle gauge is positioned thereon.

8. A level angle gauge according to claim 7 including a connector piece rigidly connected to and between said pair of arm members at respective distal arm end portions thereof so that said arm members can angularly move simultaneously between the first position and the second position, said distal arm end portions disposed opposite pivotal arm end portions of said pair of arm members.

9. A level angle gauge according to claim 8 wherein said exposed edge portion of said web includes a notch formed therein and sized and adapted to receive said connector piece when said arm structure is disposed in the first position.

10. A level angle gauge according to claim 7 wherein said arm lock mechanism includes a matable bolt and nut set having a threaded bolt and a threaded nut whereby said bolt extends through axially aligned arm holes formed in each arm member of said arm structure and a web hole formed in said web of said body structure so that in the locked state said matable bolt and nut set compresses said pair of arm members and said web together thereby resiliently retaining said arm structure in one of the first position and the second position.

11. A level angle gauge according to claim 10 wherein said nut has a cross-sectional shape of a teardrop.

12. A level angle gauge according to claim 10 including a pair of spacers, each spacer having a centrally-located spacer hole sized and adapted to rotatably receive said bolt, each spacer disposed between a respective one of said arm members and said web.

13. A level angle gauge according to claim 12 wherein including a pair of bias elements fabricated from a stiff yet resilient material, each bias element having a centrally-located bias element hole sized and adapted to rotatably receive said bolt, each bias element disposed between respective ones of said arm members and said spacers.

14. A level angle gauge according to claim 10 wherein at least one of said arm members has a square-shaped hole formed therethrough and wherein a portion of said bolt has a square cross-sectional shape sized and adapted to be received by said square-shaped hole in a closely-fitted relationship to prevent said bolt from rotating relative to said arm members.

15. A level angle gauge according to claim 7 wherein said arm reference surface has an arm surface width, said arm surface width being less than said second flat surface width.

16. A level angle gauge according to claim 15 wherein said arm structure is centrally disposed between opposite second surface edges of said second flange surface.

17. A level angle gauge according to claim 16 wherein said arm lock mechanism has a length that is less than said second flat surface width, said arm lock mechanism being centrally disposed between said opposite second surface edges of said second flange.

18. A level angle gauge according to claim 7 wherein said arm structure is operative to pivot 180° from the first position.

19. A level angle gauge according to claim 18 wherein said first flange is foreshortened at an end portion of said web so that said arm structure is enabled to pivot 270 degrees between the first position and the second position to form a square.

20. A level angle gauge according to claim 7 wherein said arm structure includes indicia so that when said arm structure is moved to the second position to capture the angular measurement of the structural surface relative to the imaginary plane a user can determine the quantitative angular measurement thereof by reading a select one of said indicia aligned with said exposed edge portion of said web.

21. A level angle gauge according to claim 7 wherein said body structure has a body length and wherein said arm has an arm strength length, said body length is at least twice as great as said arm length.

22. A level angle gauge according to claim 7 wherein said first flat surface width and said second flat surface width are equal, said first flange and said second flange being centrally disposed along said web between respective ones of opposite first flange edges and opposite second flange edges.

* * * * *